United States Patent [19]
Greenberg

[11] Patent Number: 5,743,512
[45] Date of Patent: Apr. 28, 1998

[54] WEDGE LOCK BUTTERFLY VALVE

[75] Inventor: Michael D. Greenberg, Bloomfield, Conn.

[73] Assignee: United Technologies Corporation, Windsor Locks, Conn.

[21] Appl. No.: 548,826

[22] Filed: Oct. 26, 1995

[51] Int. Cl.[6] .................................................. F16K 1/22
[52] U.S. Cl. ...................................... 251/307; 251/308
[58] Field of Search ................................. 251/307, 308

[56] References Cited

U.S. PATENT DOCUMENTS

| 3,517,689 | 6/1970 | Roos | 251/308 X |
| 4,057,217 | 11/1977 | MacDonald | 251/308 |
| 4,768,750 | 9/1988 | Wilson | 251/308 |

*Primary Examiner*—John Fox

[57] ABSTRACT

A butterfly valve assembly is disclosed wherein a wedged shaped pin is used to position and fasten the butterfly disc to the valve shaft. The valve shaft, butterfly disc and wedged shaped pin are designed to cooperate in a manner that prevents relative movement between the valve shaft and butterfly disc without the necessity of pre-assembling and drilling the valve shaft and butterfly disc. This allows manufacture and repair without having to maintain the valve shaft and butterfly disc as a matched set. In the preferred embodiment, the butterfly disc has two intersecting apertures, one for insertion of the valve shaft, the other for insertion of a wedged shaped locking pin. The valve shaft is notched such that when it is inserted in the corresponding disc a locking pin with a wedged shaped flat may be inserted through a corresponding disc aperture causing an interference fit between the shaft pin and disc thus locking the disc in position relative to the shaft.

18 Claims, 2 Drawing Sheets

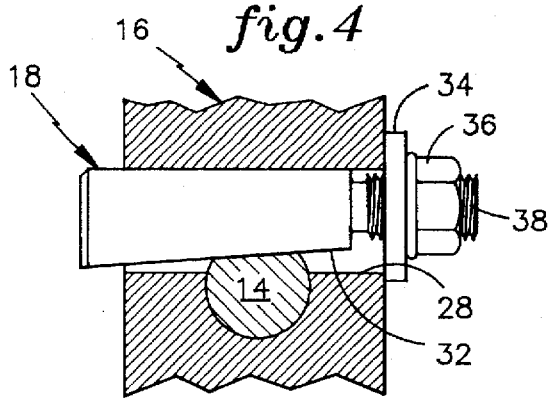
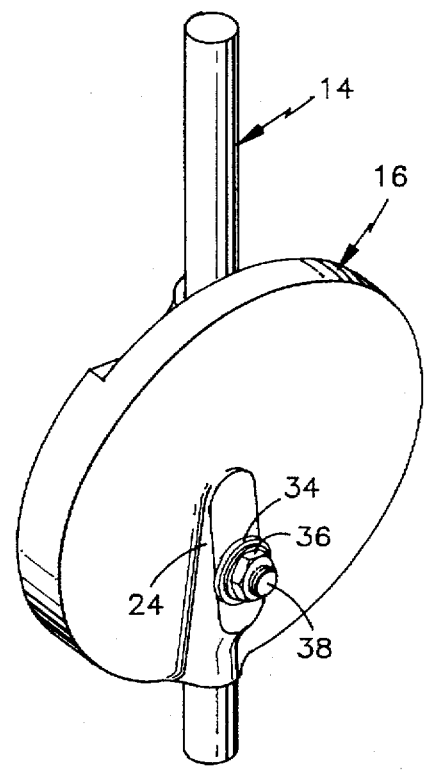
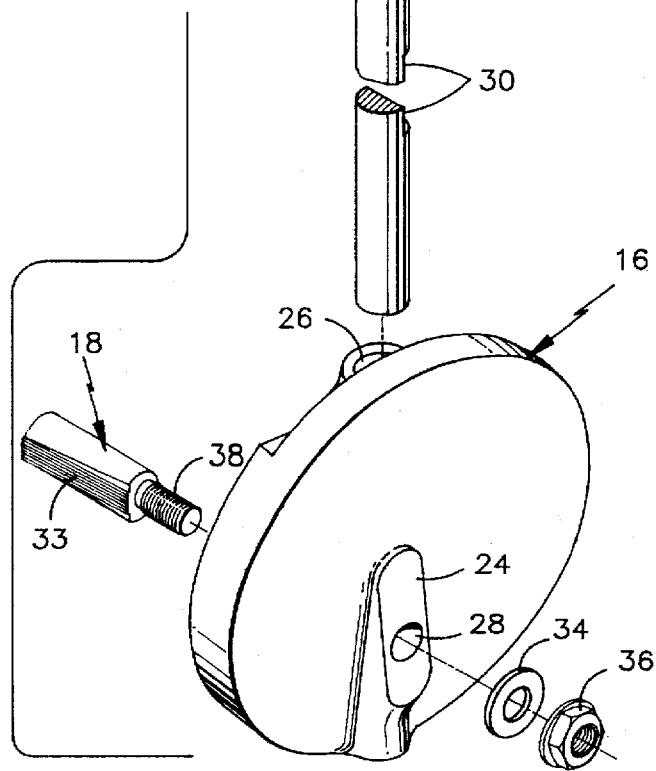
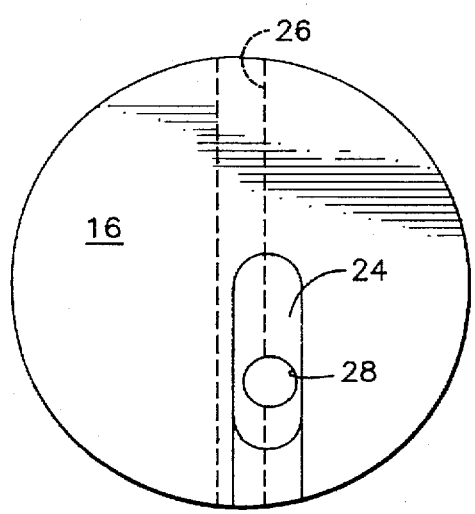

WEDGE LOCK BUTTERFLY VALVE

BACKGROUND OF THE INVENTION

This invention relates to a butterfly valve assembly and, more particularly, an assembly that prevents relative movement between the butterfly disc and valve shaft in both the torsional and axial direction during operation, while providing limited axial adjustment to align the disc during assembly and repair.

Butterfly valves used in aircraft environmental control systems, hereinafter ECS, control and balance temperature, humidity and air flow to and between cabin zones. These valves also control the flow of bleed air from an aircraft turbine to the ECS. Tight tolerances must be maintained between the butterfly disc and valve shaft to prevent relative movement that could adversely affect the valves ability to control these functions and adversely affect valve life.

Typically, the required tolerances have been achieved by assembling the butterfly disc and valve shaft and drilling holes, in two places, through both items. These items are then maintained as a matched set for assembly into the valve housing. Referring to FIG. 1, the butterfly disk is positioned in the valve housing. The valve shaft is then inserted through the valve housing and butterfly disk aligning the pre-drilled holes in the butterfly disc and valve shaft. The matched set is joined by inserting a set of fasteners, for example pins or rivets, through the aligned holes and then securing the butterfly disc to the shaft. FIG. 1A illustrates the use of a straight pin and FIG. 1B shows the use of a tapered pin for securing the butterfly disc to the valve shaft.

A second method of achieving the required tolerances has been to drill, as a matched set, two ping pong paddle shaped members, such that the body of the paddles overlap and the handles extend in opposite directions. The handles extending in opposite directions form the valve shaft and the overlapping bodies of the paddle form the valve disc.

The use of matched sets increases production and repair by necessitating the installation of a new matched set if either the disc or shaft is damaged. The use of matched sets also fixes the axial position of the disc relative to the shaft, requiring a shimming procedure to center the disc within the valve housing. The disc must be centered to prevent interference with the valve housing.

Accordingly, it is the primary object of this invention to provide a butterfly disc and valve shaft arrangement that reduces manufacture and repair time by eliminating the need to maintain matched sets.

It is another object to provide a standardized method of attachment.

It is a further object to provide a butterfly disc and valve shaft arrangement that eliminates the need for shimming to center the disc within the valve housing.

SUMMARY OF THE INVENTION

An improved butterfly valve is disclosed which prevents relative movement of the butterfly disc and its valve shaft without the use of matched sets.

In the preferred embodiment, the valve comprises a standard valve body into which a valve; shaft and butterfly disc of the present invention are assembled. The valve shaft and butterfly disc are constructed such that a wedge shaped locking pin will allow the disc to be located along the shaft's axis during assembly and, when fully assembled, will prevent movement of the disc in the axial and torsional direction relative to the shaft. The wedge angle holds the disc in a position relative to the shaft, while a lock nut and washer provide added retention of the pin and seal the aperture, through which the wedge lock pin is inserted.

The above and other objects and advantages of this invention will become more readily apparent when the following description is read in conjunction with the accompanying drawings.

BRIEF DESCRIPTION OF THE DRAWINGS

FIG. 4 is a cross-sectional view taken along line 4—4 of FIG. 3;

FIG. 5 is an exploded view of the wedge lock-pin, valve shaft, and butterfly disc of FIG. 2;

FIG. 6 shows the parts in FIG. 5 assembled;

FIG. 7 shows an elevational view of the butterfly disc of FIG. 5.

DETAILED DESCRIPTION OF THE PREFERRED EMBODIMENTS

Figure 1:
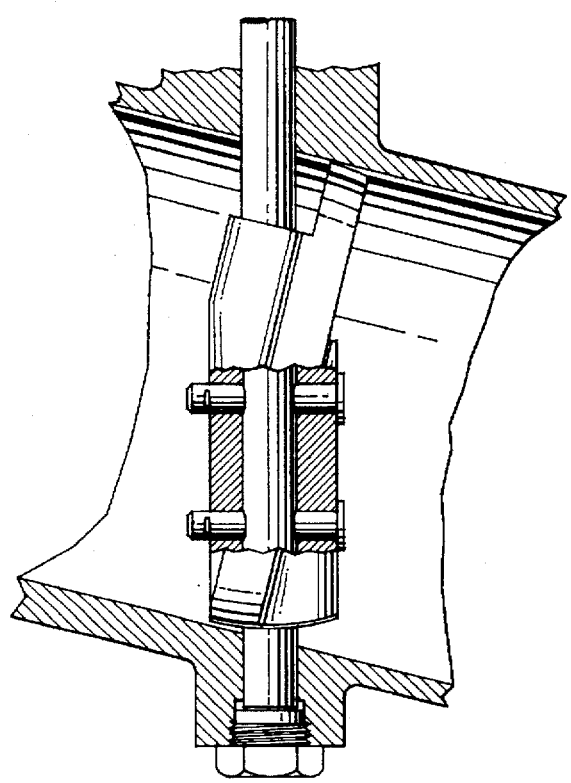
FIG. 1 shows a partial cross-sectional view of a typical butterfly valve assembly with the disc partially broken away, labeled "Prior Art"
Figure 1A:
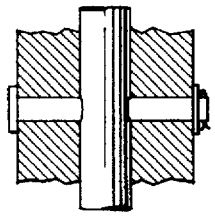
FIG. 1A shows a "Prior Art" straight pin fastener used to fasten the butterfly disc to its valve shaft.
Figure 1B:
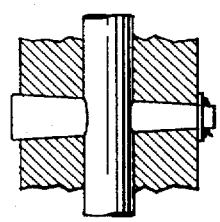
FIG. 1B shows a "Prior Art" tapered pin fastener used to fasten the butterfly disc to its valve shaft.

FIGS. 2–6 show a "Wedge Lock Butterfly Valve" assembly generally designated by the numeral 10. This preferred embodiment comprises a standard valve housing 12; a valve shaft 14; and a butterfly disc constructed in accordance with the present invention 16 joined to the shaft by a wedge lock pin 18.

Figure 2:
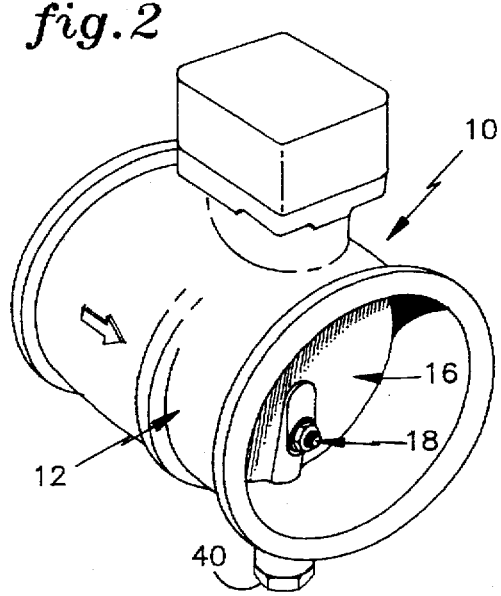
FIG. 2 shows a perspective view of a "Wedge Lock Butterfly Valve" assembly, constructed in accordance with the present invention.
Figure 3:
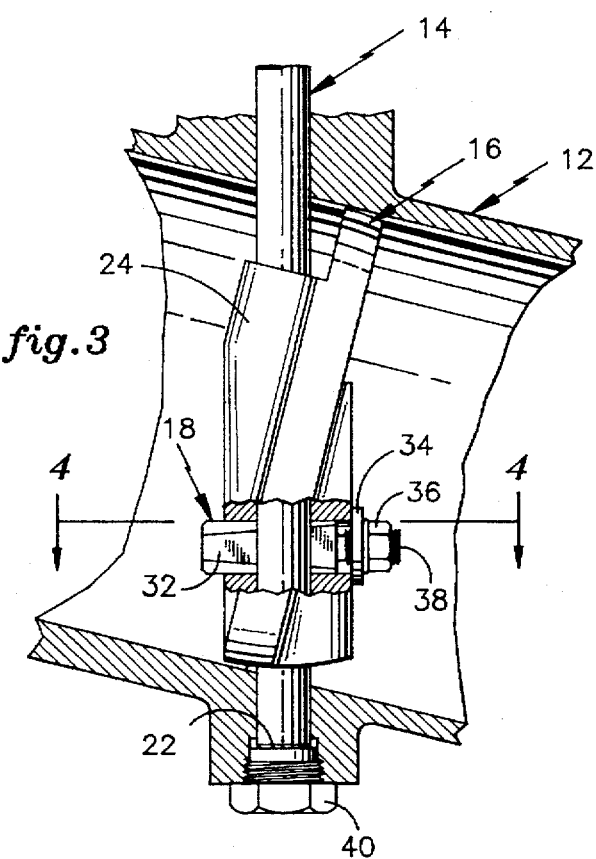
FIG. 3 is a partial cross-sectional view of the present invention showing the valve shaft and butterfly disc joined by a wedge lock pin with the disc partially broken away.

The butterfly disc 16 is a generally flat metal cylinder with a diameter. Referring to FIGS. 2–3, the disc's diameter permits the disc to snugly fit within the diameter of the valve housing 12 at a cross-section. The butterfly disc 16 may also have a circumferential gasket, not shown, to create a sealing surface between the butterfly disc 16 and the valve housing 12. In FIG. 3 the butterfly disc 16 is shown at a slight angle with the portion furthest from the bearing surface 22 being angled in the direction of fluid flow through the valve assembly 10. This provides a downward force on the butterfly disc 16 which, in turn, forces the valve shaft 14 against the bearing surface 22.

Referring to FIGS. 5–7, a portion 24 of the butterfly disc 16 is of sufficient thickness to accommodate a shaft aperture 26 through its center, along a diameter of the disc 16. As shown in FIG. 7, a pin aperture 28 is drilled through the butterfly disc 16 such that the pin aperture 28 intersects with the shaft aperture 26 and the center lines are offset. This allows the wedge lock pin 18 to be inserted through the pin aperture 28 such that it will slide into notch 30 holding the butterfly disc 16 in a position relative to the valve shaft 14. FIG. 3 shows the butterfly disc 16 at an angle relative to the valve shaft 14 and therefore the portion 24 intersects with the butterfly disc 16 at the same angle as the valve shaft 14.

The valve shaft 14 is generally rod like member of sufficient length to extend from the bearing surface 22 through the valve housing 12 to the valve actuator. The diameter of the valve shaft 14 is sized to fit in the shaft aperture 26. The valve shaft 14 is notched at 30 (see FIG. 5) such that, when the valve shaft 14 is inserted in the shaft aperture 26 and the wedge lock pin is inserted through the pin aperture 28, the inserted wedge lock pin 18 forces the valve shaft 14 against the butterfly disc 16. The resulting friction causes the butterfly disc 16 to be held in a position relative to the shaft 14. As the lock nut 36 is tightened on the threaded portion 38 of the wedge lock pin 18, the force exerted by the wedge lock pin on the notch 30 increases, locking the disc 16 in a position relative to the valve shaft 14. The notch 30 is larger than the width of the flat 32 of the wedge lock pin 18. This permits the butterfly disc 16 to be positioned along the length of the notch 30 in valve shaft 14 to provide proper clearance between the butterfly disc 16 and the valve housing 12.

The wedge lock pin 18, shown in FIG. 5, is cylindrical in shape. It has an overall length greater than the length of pin aperture 28, sufficient to accept a washer 34 and lock nut 36 on the threaded portion 38. The diameter of the wedge lock pin 18 is smaller than the pin aperture 28. A tapered wedged shaped flat 32 is located along the axis of the pin 18 such that, when it is inserted through the pin aperture 28 of assembled butterfly disc 16 and valve shaft 14, it will interfere with the notch 30 located on the valve shaft 14 The tapered wedged shape flat 32 extends from one end of the wedge lock pin 18 to a distance equal to or past where the wedge lock pin 18 contacts the notch 30 when assembled. The tapered wedge 32 is located along an axis of the wedge lock pin 18 such that the width of the flat increases as the depth from the flat to the opposite side of the pin decreases. The width of the tapered wedge shaped flat 32 is smaller than the height of notch 30.along the longitudinal axis of the valve shaft 14. This allows the wedge lock pin to be located along the axial distance of notch 30 to permit the disc 16 to positioned to prevent interference with the valve housing 12. The angle of the tapered flat 32 provides the force to lock the disc 16 in place relative to the valve shaft 14, when properly seated. The wedge lock pin 18 also has a threaded portion 38 located at the end of the wedge lock pin 18 where the flat is at its widest point. The threaded portion is of sufficient length to accept a washer 34 and a lock nut 36. When tightened, they cause an interference fit between the wedge lock pin 18 and the valve shaft 14.

In operation, the butterfly disc 16 is positioned in the valve housing 12 such that the shaft 14 can be inserted through the valve housing 12 and through the shaft aperture 26 of the butterfly disc 16. The shaft is positioned with notch 30 adjacent to the pin aperture 28 of the butterfly disc 16. The wedge lock pin 18 is then inserted through pin aperture 28 such that the tapered flat 32 lines up with the notch 30 located in the shaft 14. The pin 18 is inserted with limited force to allow disc 16 to be moved axially along shaft 14. This allows the disc to positioned along the axis of valve shaft 14 preventing interference between disc 16 and the valve housing 12. A washer 34 and a lock nut 36 are then mounted onto to the threaded end 38 of pin 18 and tightened pulling the wedge lock pin 18 through the pin aperture 28. As the wedge lock pin 18 is pulled through the pin aperture 28 the thickness of the wedge lock pin 18 between the notch 30 and the area of the butterfly disc 16 in contact with the wedge lock pin 18 increase. As this thickness increases, the friction between the valve shaft 14, wedge lock pin 18, and butterfly disc 16 increases, thus locking the butterfly disc 16 into position relative to the valve shaft 14.

When fully assembled, the lower end of the valve shaft 14 pivots on a bearing surface 22 that may be integral with the bearing cap 40. This eliminates the prior art assembly step of centering the disc within the valve housing by shimming the valve shaft.

Applicant envisions a second embodiment (not shown). The angle of the tapered flat 32 provides sufficient axial holding force for most applications. However, if additional axial holding force is required, the flat axial surface of the notch 30 can be serrated (not shown) and of harder material than the tapered flat 32 such that, when the lock nut 36 is tightened, the surface of the tapered flat 32 will be deformed by the serrations, thereby providing interlocking surfaces. Additional axial force can also be achieved by having the tapered flat 32 of a harder material than the axial flat surface of the notch 30 and serrating 33 the tapered flat 32.

It should be understood by those skilled in the art that obvious structural modifications can be made without departing from the spirit or scope of the invention. For example, a routineer may achieve additional axial holding force through use of multiple wedge lock pins and associated structure for a single disc and valve shaft. Accordingly, reference should be made primarily to the accompanying claims, rather than the foregoing specification, to determine the scope of the invention.

Having thus described the invention, what is claimed is:

1. A wedge lock valve comprising:
   (a) a valve housing;
   (b) a disc rotatably movable within said housing, said disc having a first aperture extending generally axially through said disc, and a second aperture extending generally diametrically through said disc, wherein the second aperture is offset relative to and intersects said first aperture;
   (c) a valve shaft positionable in a selected position in said valve housing and extending through said second aperture; and
   (d) an aligning means for movably positioning said disc along said valve shaft to secure said disc in a selected position relative to said valve shaft, said aligning means including a notch in said valve shaft, wherein said notch is adapted to be aligned with said first aperture and a pin extending through said first aperture, said pin having a tapered flat portion along its length for matingly engaging a surface of said notch, wherein said valve shaft has a greater hardness than said pin and said surface of said notch is serrated.

2. A wedge lock valve as set forth in claim 1 wherein said tapered flat portion has a width that increases as a depth from said tapered flat portion to a side opposite said tapered flat portion decreases.

3. A wedge lock valve as set forth in claim 1 further comprising a tightening means located on an end portion of said pin for moving said tapered flat portion along said first aperture for engagement with said notch to create an interference fit, whereby said disc is locked in a position relative to said valve shaft.

4. A wedge lock valve as set forth in claim 1 wherein said notch has a length along a longitudinal axis of said valve shaft, wherein said length is greater than the distance of said tapered flat as measured perpendicular to the axis of said pin, whereby said distance of said tapered flat is positioned along said length of said notch.

5. A wedge lock valve as set forth in claim 1 wherein the materials of said valve shaft and said pin have differing hardnesses.

6. A wedge lock valve as set forth in claim 1 further comprising said valve housing having a shimless bearing surface for engagement with an end of said valve shaft whereby said valve shaft rotates about said longitudinal axis on said bearing surface.

7. A wedge lock valve as set forth in claim 6 wherein said tapered flat portion has a width that increases as a depth from said tapered flat portion to a side opposite said tapered flat portion decreases.

8. A wedge lock valve as set forth in claim 6 further comprising a tightening means located on an end portion of said pin for pulling said tapered flat portion through said first aperture for engagement with said notch to create an interference fit, whereby said disc is locked in a position relative to said valve shaft.

9. A wedge lock valve as set forth in claim 6 wherein said notch has a length along said longitudinal axis of said valve shaft, wherein said length is greater than the distance of said tapered flat as measured perpendicular to the axis of said pin, whereby said distance of said tapered flat is positioned along said length of said notch.

10. A wedge lock valve as set forth in claim 6 wherein the materials of said valve shaft and said pin have differing hardnesses.

11. The wedge lock valve according to claim 1, wherein said disk is comprised of two substantially flat sides, and wherein said first aperture extends generally axially relative said disk from one of said two sides to another of said two sides.

12. The wedge lock valve according to claim 1, wherein said valve housing has a diameter, and wherein in a closed position of said valve, said first aperture extends generally axially through said disk and substantially transverse to said diameter.

13. A wedge lock valve comprising:
   (a) a valve housing;
   (b) a disc rotatably movable within said housing, said disc having a first aperture extending generally axially through said disc, and a second aperture extending generally diametrically through said disc, wherein the second aperture is offset relative to and intersects said first aperture;
   (c) a valve shaft positionable in a selected position in said valve housing and extending through said second aperture; and
   (d) an aligning means for movably positioning said disc along said valve shaft to secure said disc in a selected position relative to said valve shaft, said aligning means including a notch in said valve shaft, wherein said notch is adapted to be aligned with said first aperture and a pin extending through said first aperture, said pin having a tapered flat portion along its length for matingly engaging a surface of said notch, wherein said pin is has a greater hardness than said valve shaft and said tapered flat portion is serrated.

14. A butterfly valve comprising:
   (a) a valve housing;
   (b) a disc rotatably movable within said housing, said disc having a first aperture extending through said disc, said disc having a second aperture extending diametrically through said disc, wherein the second aperture is offset from and intersects said first aperture;
   (c) a valve shaft positionable in a selected position in said valve housing and extending through said second aperture; and
   (d) said valve shaft having a notch, said notch adapted to be aligned with said first aperture; and
   (e) a pin extending through said first aperture said pin having a tapered flat portion along its length for matingly engaging a surface of said notch, wherein said valve shaft has a greater hardness than said pin and said surface of said notch is serrated,
   (f) a tightening means located on an end portion of said pin for moving said tapered flat portion along said first aperture for engagement with said notch to create an interference fit, wherein said disc locked in a position relative to said valve shaft.

15. A butterfly valve comprising:
   (a) a valve housing;
   (b) a disc rotatably movable within said housing, said disc having a first aperture extending through said disc, said disc having a second aperture extending diametrically through said disc, wherein the second aperture is offset from and intersects said first aperture;
   (c) a valve shaft positionable in a selected position in said valve housing and extending through said second aperture; and
   (d) said valve shaft having a notch, said notch adapted to be aligned with said first aperture; and
   (e) a pin extending through said first aperture said pin having a tapered flat portion along its length for matingly engaging a surface of said notch, wherein said pin has a greater hardness than said valve shaft and said tapered flat portion is serrated,
   (f) a tightening means located on an end portion of said pin for moving said tapered flat portion along said first aperture for engagement with said notch to create an interference fit, wherein said disc locked in a position relative to said valve shaft.

16. A butterfly valve as set forth in claim 15 wherein said notch has a length along the longitudinal axis of said valve shaft, wherein said length is greater than the distance of said tapered flat as measured perpendicular to the axis of said pin, whereby said pin is positioned along said length of said notch.

17. A butterfly valve as set forth in claim 15 further comprising said valve housing having a shimless bearing surface for engagement with an end of said valve shaft whereby said valve shaft rotates about its longitudinal axis on said bearing surface.

18. A butterfly valve as set forth in claim 15 wherein the materials of said valve shaft and said pin have differing hardnesses.

* * * * *